United States Patent
Yang et al.

(10) Patent No.: US 12,043,213 B2
(45) Date of Patent: Jul. 23, 2024

(54) ELECTRIC RUNNING BOARD AND LINKAGE FOR ELECTRIC RUNNING BOARD

(71) Applicant: WINBO-DONGJIAN AUTOMOTIVE TECHNOLOGY CO., LTD., Foshan (CN)

(72) Inventors: Jie Yang, Foshan (CN); Guodong Luo, Foshan (CN); Changbiao Chen, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 394 days.

(21) Appl. No.: 17/563,081

(22) Filed: Dec. 28, 2021

(65) Prior Publication Data

US 2023/0133412 A1 May 4, 2023

(30) Foreign Application Priority Data

Nov. 1, 2021 (CN) .......................... 202111284768.2

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC ............ B60R 3/02; B60R 3/002; B60R 3/007
See application file for complete search history.

(56) References Cited

U.S. PATENT DOCUMENTS

| | | | | |
|---|---|---|---|---|
| 7,118,120 B2* | 10/2006 | Lee | ......................... | B60R 3/002 |
| | | | | 280/166 |
| 8,714,575 B2* | 5/2014 | Watson | ..................... | B60R 3/02 |
| | | | | 280/166 |
| 9,669,767 B2* | 6/2017 | Du | ............................ | B60R 3/02 |
| 10,150,419 B2* | 12/2018 | Derbis | .................... | B60R 3/002 |
| 10,384,614 B1* | 8/2019 | Du | .......................... | B60R 3/002 |

* cited by examiner

*Primary Examiner* — John D Walters

(57) ABSTRACT

A linkage for an electric running board is provided. The linkage includes a dual-output motor, a first linkage group including a first output terminal and a second output terminal, and a second linkage group; and the first output terminal of the dual-output motor is connected to the first linkage group, and the second output terminal of the dual-output motor is connected to the second linkage group. Furthermore, the electric running board is provided. The electric running board includes a running board assembly and the linkage, and the running board assembly is connected to the linkage.

15 Claims, 7 Drawing Sheets

ELECTRIC RUNNING BOARD AND LINKAGE FOR ELECTRIC RUNNING BOARD

CROSS REFERENCE TO RELATED APPLICATIONS

The application claims priority to Chinese Patent Application No. 202111284768.2 filed on Nov. 1, 2021, which are hereby incorporated by reference in their entireties.

TECHNICAL FIELD

The invention relates to the field of vehicle components, and in particular to an electric running board and a linkage for the electric running board.

BACKGROUND

A running board is a vehicle component usually installed on a side of the vehicle. The running board is configured to provide a step for users, and to assist the users to get on and off easily. At the same time, a side running board can protect a side skirt of the vehicle from a direct collision in daily life, so as to protect a vehicle body. There are some vehicles whose chassis is higher from a ground, such as pickup trucks. From an ergonomic point of view, a comfortable lifting distance for people's feet is in a range from 130 mm to 180 mm. However, a step height of getting on and off the pickup trucks is usually in a range from 380 mm to 450 mm, which is far beyond the comfortable lifting range. Therefore, a running board is provided to meet market needs, which can reduce the step height and is convenient for the users to get on and off. Furthermore, the running board does not affect a vehicle driving and use safety.

SUMMARY OF THE DISCLOSURE

In one aspect of one embodiment the present disclosure, a linkage for an electric running board is provided. The linkage includes a dual-output motor, a first linkage group, and a second linkage group; a first output terminal of the dual-output motor is connected to the first linkage group, and a second output terminal of the dual-output motor is connected to the second linkage group.

In another aspect of one embodiment of the present disclosure, an electric running board is provided. The electric running board includes a running board assembly and the linkage, and the running board assembly is connected to the linkage.

The linkage for the electric running board provided by the embodiments of the present disclosure utilizes a structure of a double-shaft motor driving at two ends, and has the followings features: the linkage has a stable structure and is convenient to install. Furthermore, the linkage is arranged with a structure of a gear transmission and gears engaging with double shafts, and it has the following features: a simple structure and being reliable to drive. In addition, the electric running board provided by the embodiments of the present disclosure utilizes a structure of a link assembly, and is capable of being stretchable. Moreover, by arranging the link assembly on a linkage group, a structure of gears matching with links is formed, which has features of a reliable transmission and a simple structure. Furthermore, through the linkage matching with the running board assembly, it is possible to make the electric running board synchronously lift, have a stable structure, be highly versatile, and have a reliable transmission.

BRIEF DESCRIPTION OF THE DRAWINGS

In order to more clearly describe the technical solutions in the embodiments of the present disclosure, the drawings that need to be used in the description of the embodiments or the related art will be briefly described in the following. Apparently, the drawings in the following description are only some embodiments of the present disclosure. For those skilled in the art, other drawings can be obtained based on these drawings without creative work.

DETAILED DESCRIPTION

Embodiments and drawings of the present disclosure will be described in detail below. It would be understood that the embodiments described below with reference to the drawings are illustrative and are intended to explain the present disclosure, and cannot be construed as a limitation to the present disclosure. Similarly, the following embodiments are only a part of the embodiments of the present disclosure, but not all of embodiments. All other embodiments obtained by a person of ordinary skill in the art based on the embodiments of the present invention without creative work shall fall within the protection scope of the present disclosure.

Reference to "embodiments" herein means that a specific feature, structure, or characteristics described in conjunction with the embodiments may be included in at least one embodiment of the present disclosure. The appearance of the phrase in various places in the disclosure does not necessarily refer to the same embodiment, nor is an independent or alternative embodiment mutually exclusive with other embodiments. Those skilled in the art clearly and implicitly understand that the embodiments described herein can be combined with other embodiments.

Figure 1:
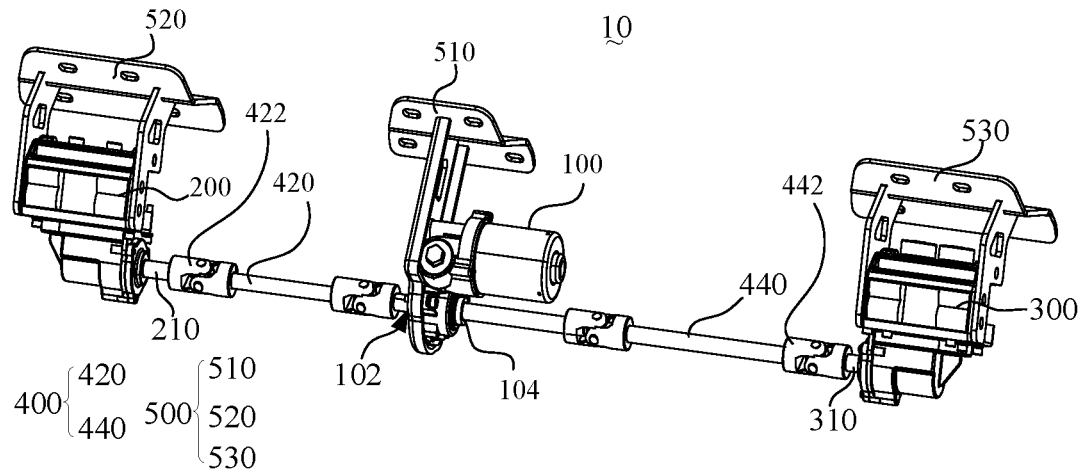
FIG. 1 is an overall structural view of a linkage for an electric running board according to one embodiment of the present disclosure.
Figure 12:
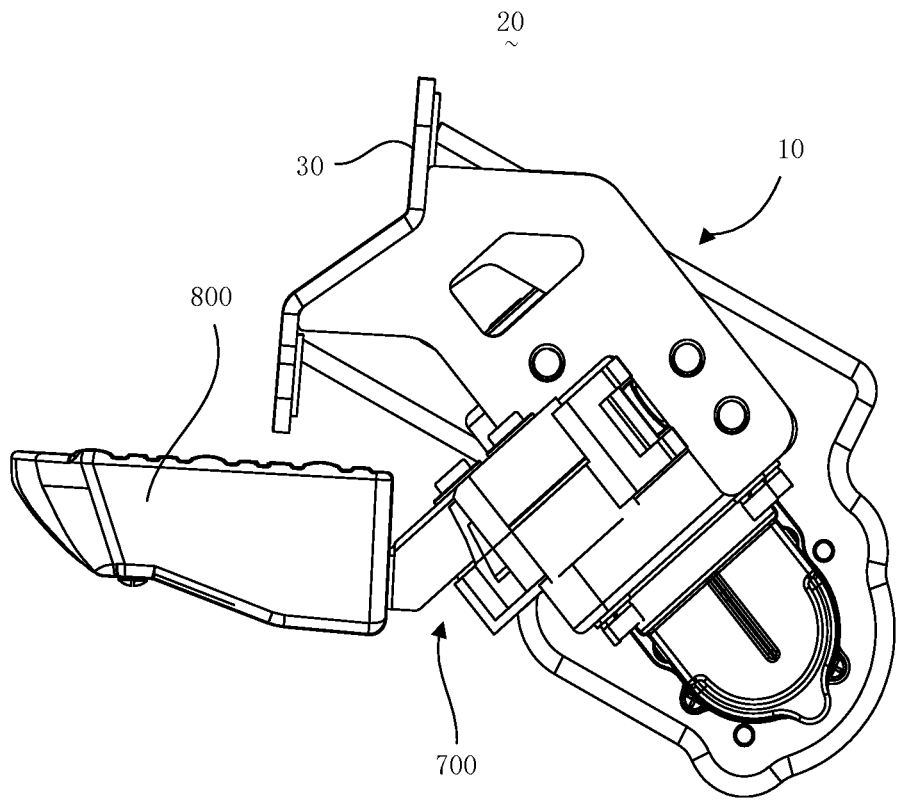
FIG. 12 is a side structural view of one embodiment of the electric running board of the present disclosure in a retracted state.

Referring to FIG. 1, which is an overall structural view of a linkage for an electric running board according to one embodiment of the present disclosure. It should be noted that an electric running board 20 in the present disclosure may be used to a carrier including a door opening and closing structure. Specifically, the electric running board 20 may be arranged on a side of a vehicle body 30 (as shown in FIG. 12), so that it is possible to facilitate people getting on and off. Of course, the electric running board 20 of the embodiments may also be arranged on a rear of the vehicle body 30 or other parts, or even on other carriers except the vehicle, which is not specifically limited herein. A linkage 10 for the electric running board 20 according to the embodiment of the present disclosure includes, but is not limited to, a dual-output motor 100, a first linkage group 200, a second linkage group 300, transmission members 400, and connections 500. In addition, the dual-output motor 100 may be a motor, whose two ends are provided with a first output terminal 102 and a second output terminal 104, that is to say, the dual-output motor 100 is provided with two sides, and one side of the dual-output motor 100 is provided with the first output terminal 102, and another side of the dual-output motor 100 is provided with the second output terminal 104. In addition, the first output terminal 102 and the second output terminal 104 are synchronously output and output directions are the same. In addition, the first output terminal 102 and the second output terminal 104 may output a power through structures of output shafts. It would be understood that in other embodiments of the present disclosure, the output directions of the first output terminal 102 and the second output terminal 104 of the dual-output motor 100 may also be different from each other. The first linkage group 200 and the second linkage group 300 are arranged on two sides of the dual-output motor 100, that is to say, the first linkage group 200 is connected to the first output terminal 102 of the dual-output motor 100, and the second linkage group 300 is connected to the second output terminal 104 of the dual-output motor 100.

The first linkage group 200 includes a first input part 210, a first transmission part 260, and a first output part 240. The first input part 210 is connected to the first output terminal 102 of the dual-output motor 100, in order to transmit a power outputted by the dual-output motor 100 from the first output terminal 102 to the first linkage group 200. The first transmission part 260 is connected to the first input part 210 and the first output part 240. The first transmission part 260 is configured to change a direction of a power inputted by the first input part 210 and transmit the power to the first output part 240. The first output part 240 is configured to output a power converted and transmitted by the first transmission part 260.

The second linkage group 300 includes a second input part 310, a second transmission part 360, and a second output part 340. The second input part 310 is connected to the second output terminal 104 of the dual-output motor 100, so as to transmit the power outputted by the dual-output motor 100 from the second output terminal 104 to the second linkage group 300. The second transmission part 360 is connected to the second input part 310 and the second output part 340. The second transmission part 360 is configured to change a direction of a power inputted by the second input part 310, and transmit the power to the second output part 340. The second output part 340 is configured to output the power converted and transmitted by the second transmission part 360.

In this embodiment, the linkage 10 is capable of synchronously outputting a power in the same direction at the two ends of the dual-output motor 100 via matching structures of the dual-output motor 100, the first linkage group 200, and the second linkage group 300, so that it is possible to make the electric running board 20 provided with the linkage 10 synchronously lift and have a stable structure. It should be understood that in other embodiments of the present disclosure, output directions of the first linkage group 200 and the second linkage group 300 may not be the same direction, which is not specifically limited herein. In the embodiment of the present disclosure, the first linkage group 200 and the second linkage group 300 can realize force transmission and conversion through a gear group structure or through a linkage group structure to achieve force transmission and conversion, or through other structures to achieve force transmission and conversion, which is not specifically limited herein.

In this embodiment, the transmission members 400 includes a first transmission member 420 and a second transmission member 440. The first transmission member 420 may be arranged between the first linkage group 200 and the dual-output motor 100, and the second transmission member 440 may be arranged between the second linkage group 300 and the dual-output motor 100, in order to synchronously transmit an power outputted by the dual-output motor 100 to the first linkage group 200 and the second linkage group 300 arranged on the two sides. The first input part 210 of the first linkage group 200 is provided with a first fixed protrusion 212, and the second input part 310 of the second linkage group 300 is provided with the second fixed protrusion 312. A first junction 422 is arranged between the first transmission member 420 and the first input part 210, and the first junction 422 is provided with a thread structure. Similarly, a second junction 442 is arranged between the second transmission member 440 and the second input part 310, and the second junction 442 is also provided with the thread structure. When assembling, it is possible to realize a connection of the first transmission member 420 and the first input part 210 by inserting a screw to press the first protrusion 212. Similarly, it is also possible to realize a connection of the second transmission member 440 and the second input part 310 by inserting a screw to press the second protrusion 312. In other embodiments of the present disclosure, the first linkage group 200 may also be connected to the first transmission member 420 by bolted connections, locking connections, and the like. Similarly, the first linkage group 300 may also be connected to the second transmission member 440 by the same way as that of the first linkage group 200 connected to the first transmission member 440, which will not be repeated herein. In the embodiment of the present disclosure, the linkage 10 may be assembled on different carriers by replacing the transmission members 400 with different specifications, thereby improving a versatility of the linkage 10 and the electric running board 20 with the linkage 10.

In this embodiment, the linkage 10 further includes the connections 500. The connections 500 may be fixing brackets. The connections 500 are configured to fix the dual-output motor 100, the first linkage group 200, and the second linkage group 300 on the vehicle body 30. It should be understood that the connections 500 are elements configured to fix the linkage 10 on the carrier. In other embodiments of the present disclosure, the connections 500 may also be other elements that may be capable of connecting and fixing. It would be understood that the connections 500 may be omitted in other embodiments, for example, when the linkage 10 is matching with the carrier provided with connecting and fixing structure, or when the electric running board 20 is arranged with a component structured to connect and fix.

It should be noted that terms "including" and "having" in the embodiments of the present disclosure and any variations thereof are intended to cover non-exclusive inclusions. For example, a process, method, system, product, or device that includes a series of steps or units is not limited to the listed steps or units, but includes unlisted steps or units in some embodiments, or also includes other steps or components inherent to these processes, methods, products or equipment in some embodiments.

Figure 2:
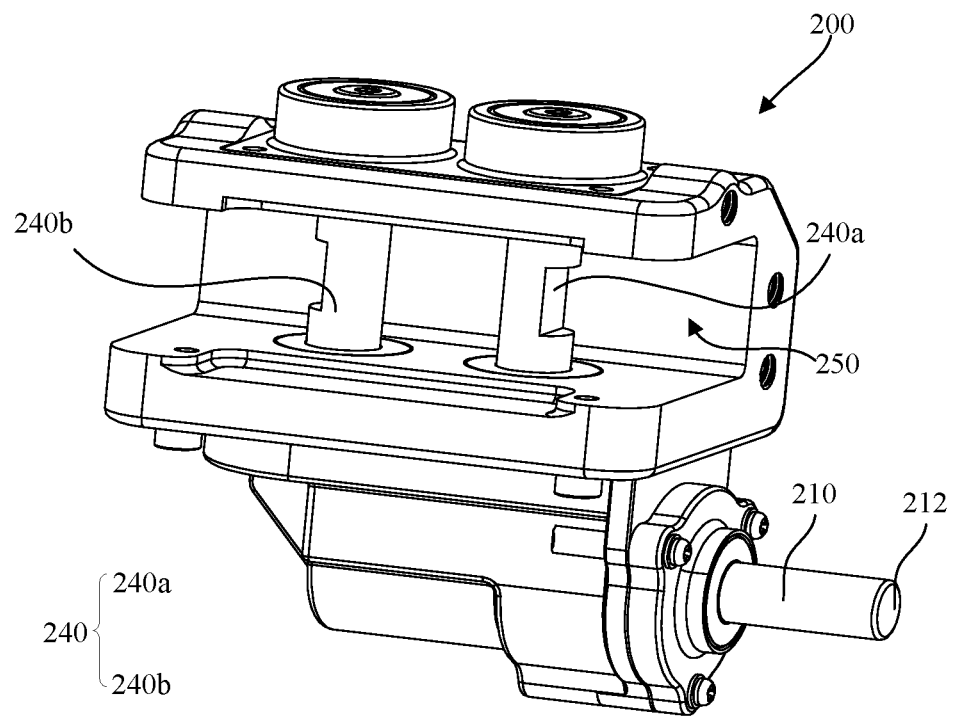
FIG. 2 is a structural view of a first linkage group in the embodiment of FIG. 1.
Figure 3:
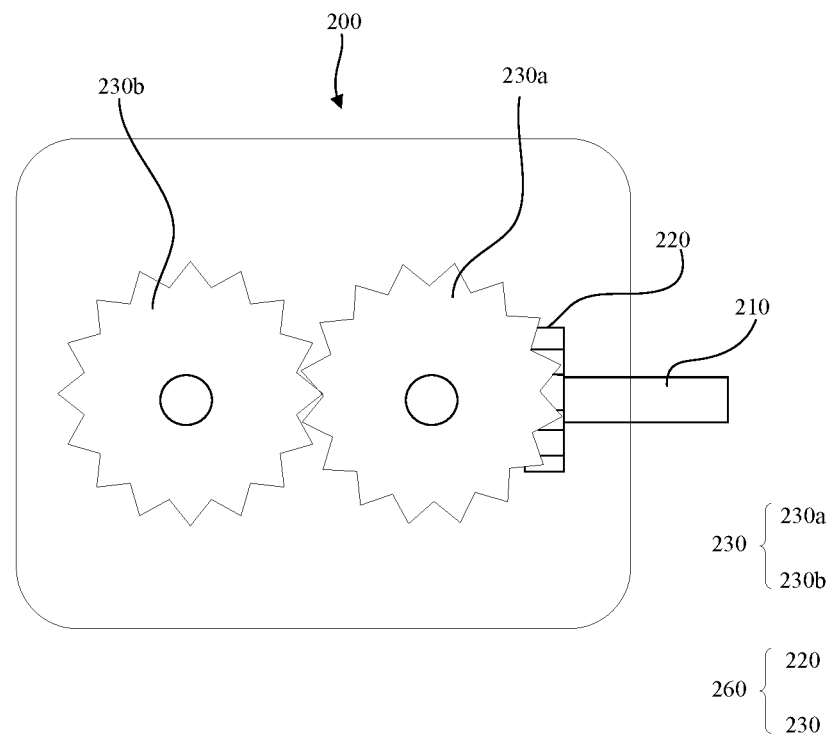
FIG. 3 is a top-sectional structural view of the embodiment of FIG. 2.

Further, referring to FIG. 2 to FIG. 5, FIG. 2 is a structural view of the first linkage group 200 in the embodiment in FIG. 1, and FIG. 3 is a top-sectional structural view in the embodiment of FIG. 2. In some embodiments, the first transmission part 260 includes a first switching gear 220 and a first transmission gear 230. More specially, in some embodiments, the first transmission gear 230 includes a first sub-transmission gear 230a and a second sub-transmission gear 230b, and the first output part 240 includes a first sub-output part 240a and a second sub-output part 240b. The first input part 210 is configured to transmit the power outputted by the dual-output motor 100 from the first output terminal 102 to the first switching gear 220 of the first linkage group 200. The first switching gear 220 is driven to rotate by the first input part 210, so that the first switching gear 220 may transmit the power to the first sub-transmission gear 230a. The first sub-transmission gear 230a is connected to the first switching gear 220. More specifically, the first sub-transmission gear 230a and the second sub-transmission gear 230b are connected in parallel on the same plane, and a plurality of gear teeth of the first sub-transmission gear 230a are engaged with a plurality of gear teeth of the second sub-transmission gear 230b, so as to drive the second sub-transmission gear 230b to rotate and a rotational direction of the second sub-transmission gear 230b is opposite to that of the first sub-transmission gear 230a. For example, when the first sub-transmission gear 230a rotates in an anticlockwise direction (the embodiment shown in FIG. 2 is viewed from top to bottom), to drive the second sub-transmission gear 230b to rotate in a clockwise direction (the embodiment shown in FIG. 2 is viewed from top to bottom)), so that it is possible to make the first sub-transmission gear 230a and the second sub-transmission gear 230b rotate in opposite directions. The first sub-transmission gear 230a is connected to the first sub-output part 240a, and the second sub-transmission gear 230b is connected to the second output part 240b, so that it is possible to make the first sub-output part 240a and the second output part 240b rotate in opposite directions. It should be understood that when the dual-output motor 100 changes the output direction of a force of the first output terminal 102, rotational directions of components of the first linkage group 200 may also change accordingly. It should be noted that the number of the switching gear 220 of the first linkage group 200 may be one or more. Similarly, the number of the sub-transmission gear 230a or the sub-transmission gear 230b may be one or more. The first switching gear 220 and the first sub-transmission gear 230a may be connected at a non-vertical angle. The first sub-transmission gear 230a and the second sub-transmission gear 230b may be connected in the different planes or at a non-parallel angle. It should be noted that the number and positional relationship of each of gears is not limited herein.

Figure 4:
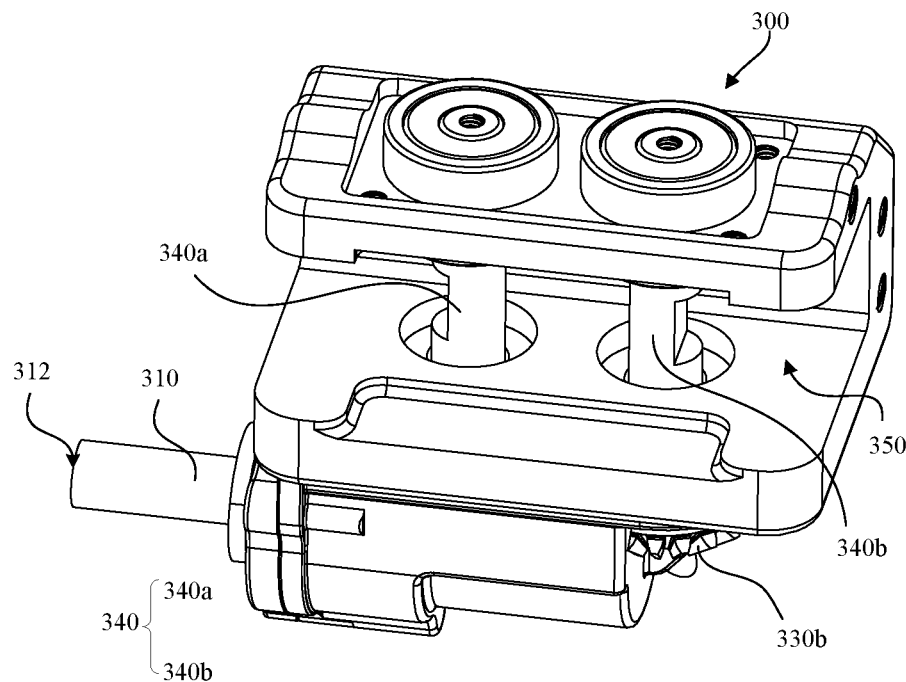
FIG. 4 is a structural view of a second linkage group in the embodiment of FIG. 1.
Figure 5:
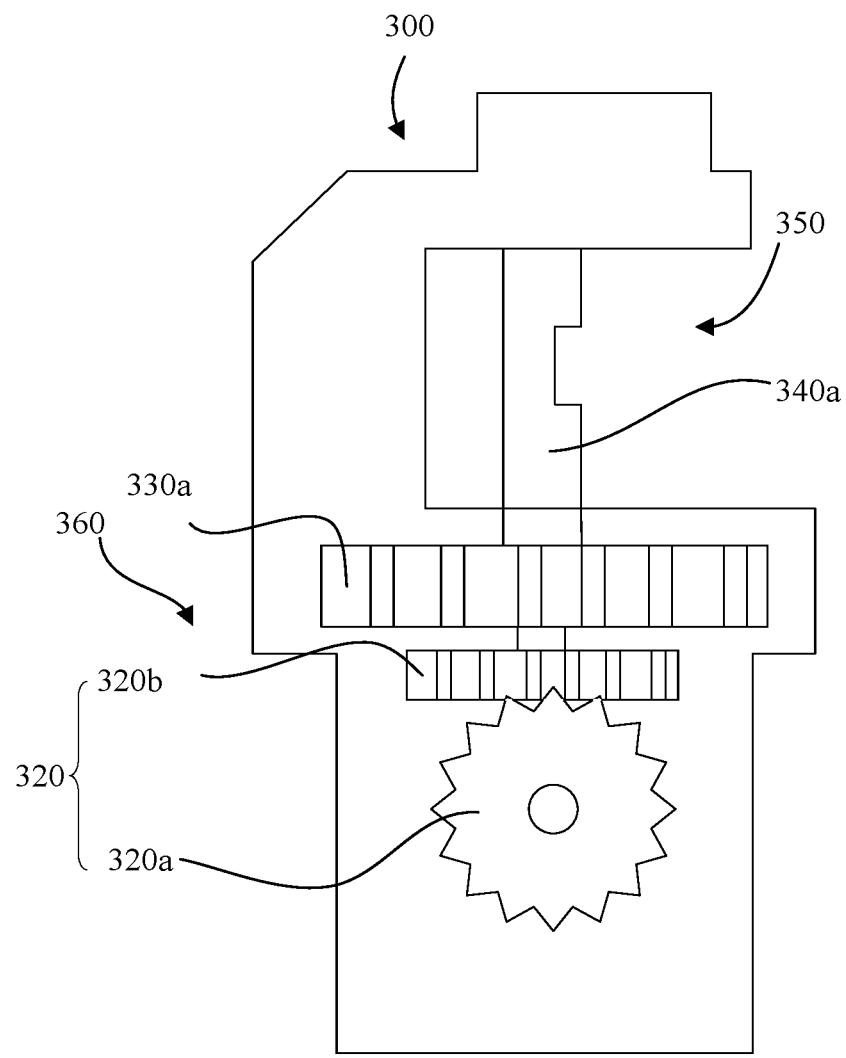
FIG. 5 is a side-sectional structural view of the embodiment of FIG. 4.

Please continue to refer to FIG. 4 and FIG. 5, FIG. 4 is a structural view of the second linkage group in the embodiment of FIG. 1, and FIG. 5 is a side-sectional structural view in the embodiment in FIG. 4. In this embodiment, a structure of the second linkage group 300 is substantially the same as that of the first linkage group 200. In the linkage 10, the first linkage group 200 and the second linkage group 300 are arranged on the two sides of the dual-output motor 100 to form a stable output structure and keep the first linkage group 200 and the second linkage group 300 output synchronously.

In this embodiment, the second transmission part 360 includes a second switching gear 320 and a first transmission gear 330. More specially, in some embodiments, the second switching gear 320 includes a third sub-switching gear 320a and a fourth sub-switching gear 320b, the second transmission gear 330 includes a third sub-transmission gear 330a and a fourth sub-transmission gear 330b, and the second output part 340 includes a third sub-output part 340a and a fourth sub-output part 340b. The second input part 310 drives the third sub-adapting gear 320a to rotate, the third sub-switching gear 320a and the fourth sub-switching gear 320b are perpendicularly connected and gear teeth of the third sub-switching gear 320a and the fourth sub-switching gear 320b are engaged with each other, so as to drive the fourth sub-transmission gear 330b to rotate, thereby changing a force transmitting direction. The fourth sub-switching gear 320b is connected to the third sub-transmission gear 330a, thereby driving the third sub-transmission gear 330a to rotate. In addition, the third sub-transmission gear 330a is horizontally connected to the fourth sub-transmission gear 330b on the same plane and gear teeth of the third sub-transmission gear 330a and the fourth sub-transmission gear 330b are engaged with each other, so as to drive the third sub-transmission gear 330a and the fourth sub-transmission gear 330b to rotate in opposite directions. The third sub-transmission gear 330a is connected to the third sub-output part 340a, the fourth sub-transmission gear 330b is connected to the fourth sub-output part 340b, so that it is possible to drive the third output part 340a and the fourth output part 340b to rotate in opposite directions.

It should be noted that the outputs of the first output terminal 102 and the second output terminal 104 of the dual-output motor 100 are synchronized and the output directions are the same, so as to make of the first input part 210 and the second input part 310 have the same rotational directions. Furthermore, rotational directions of the first sub-output part 240a and the fourth sub-output part 340b are the same, and a rotational direction of the second sub-output part 240b is the same as that of the third sub-output part 340a. It should be understood that in other embodiments of the present disclosure, the rotational directions of the first output terminal 102 and the second output terminal 104 of the dual-output motor 100 can also be opposite. In addition, the number of the second switching gear 320 may be provided with two gears or a plurality of gears, and the second transmission gear 330 may be provided with two or a plurality of gears. The third sub-switching gear 320a and the fourth sub-switching gear 320b may be connected at a non-vertical angle, the third sub-transmission gear 330a and the fourth sub-transmission gear 330b may be connected in different planes, or connected non-horizontally. The number and positional relationship of the second switching gear 320 and the second transmission gear 330 are not specifically limited herein.

It should be noted that in the embodiments of the present disclosure, the first linkage group 200 and the second linkage group 300 are configured to transmit the power outputted by the dual-output motor 100 and change a power direction. The structures of the first linkage group 200 and the second linkage group 300 are not limited herein It should be understood that the first linkage group 200 and the second linkage group 300 may be gear sets or link assemblies capable of transmitting the power, which is not specifically limited herein.

Materials of the first linkage group 200 and the second linkage group 300 may be stainless steel, rigid plastic, resin or aluminum alloy, or the like, and a housing of the first linkage group 200 may be fixedly connected to a housing of the second linkage group 300 by means of screw-fixing, snap-fitting, or pasting-fixing, or the like.

The linkage 10 for the electric running board 20 provided by the embodiments of the present disclosure utilizes a structure of the double-shaft motor driving at the two ends, and has the following feature: a stable structure, and being convenient to install. Furthermore, the linkage 10 is arranged with a structure of gears transmission and gears engaging with shafts, and it has the followings features: a simple structure and being reliable to drive.

It should be noted that terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise.

Figure 6:
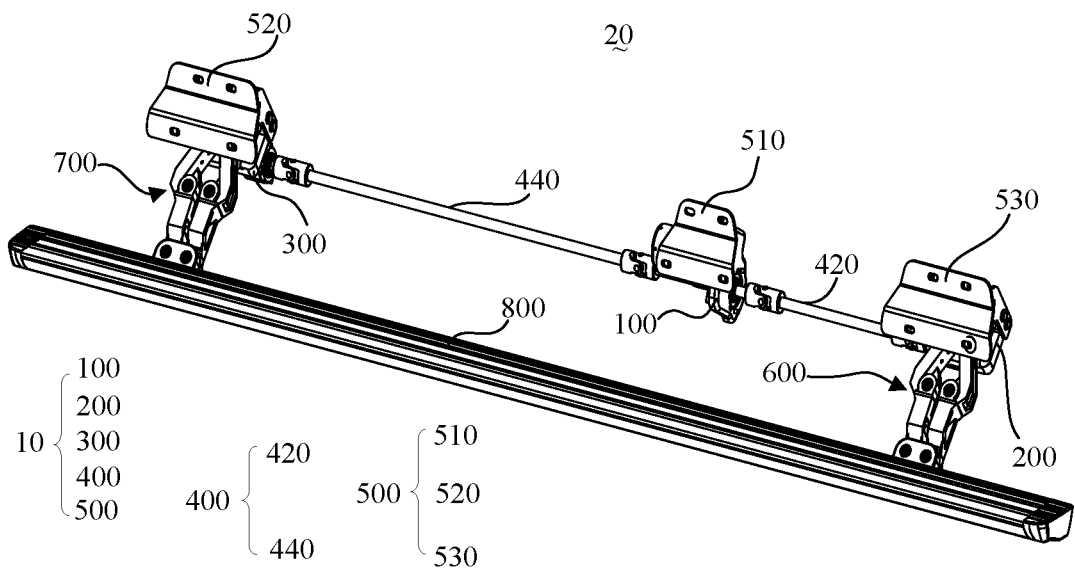
FIG. 6 is a structural view of the electric running board according to one embodiment of the present disclosure.
Figure 7:
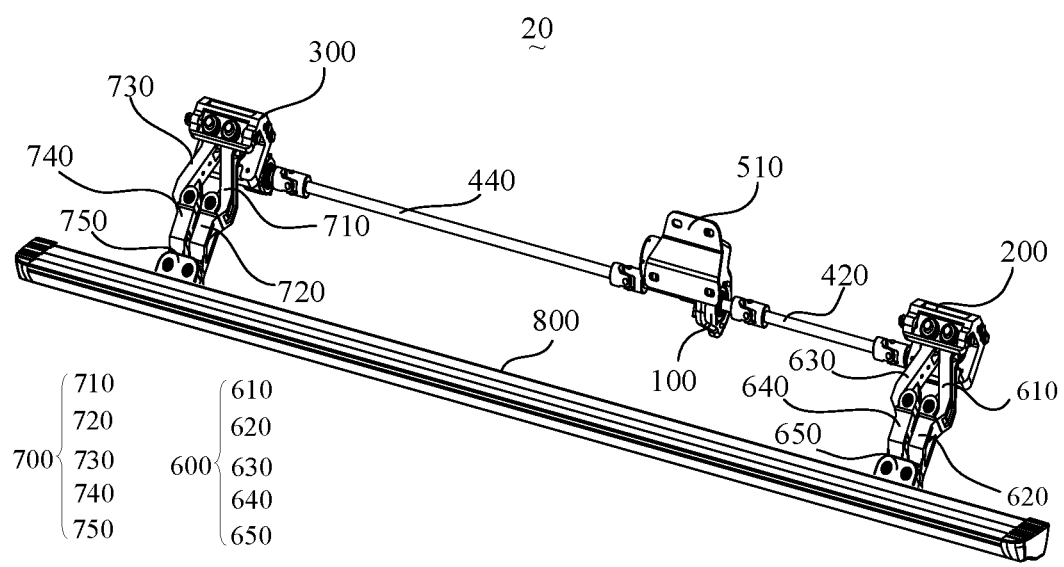
FIG. 7 is a structural view of connections corresponding to linkage groups being removed in the embodiment of FIG. 6.

Referring to FIG. 6 and FIG. 7, FIG. 6 is a structural view of the electric running board according to one embodiment of the present disclosure, and FIG. 7 is a structural view of the connections corresponding to the linkage groups being removed in the embodiment of FIG. 6. In some embodiments, the electric running board 20 includes the linkage 10, a first transmission assembly 600, a second transmission assembly 700, and a running board element 800. The first transmission assembly 600 and the second transmission assembly 700 are telescopic link assemblies. Furthermore, the first transmission assembly 600 is connected to the first linkage group 200, and the second transmission assembly 700 is connected to the second linkage group 300. In the case, an extension and retraction of the first transmission assembly 600 and the second transmission assembly 700 are controlled by changing the output power directions of the first linkage group 200 and the second linkage group 300. The first transmission assembly 600 and the second transmission assembly 700 are also connected to the running board element 800, so that the electric running board 20 can control an expansion and retraction of the running board element 800 by controlling the expansion and retraction of the first transmission assembly 600 and the second transmission assembly 700. In a specific implementation embodiment, the linkage 10 may be fixed on an inner side of the vehicle body 30 through the connections 500, and the running board element 800 may be located on an outer side of the vehicle body 30, so that an expansion and retraction of the electric running board 20 may be controlled by controlling the expansion and retraction of the first transmission assembly 600 and the second transmission assembly 700. At the same time, it is possible to make the linkage 10 reduce space of the outer side of vehicle body 30.

At present, a base structure of a conventional electric running board is metal, steel or aluminum alloy, and the conventional electric running board is driven by a single motor. When opening a vehicle door, a system of the conventional electric running board detects a switch of the vehicle door, so that a bracket is driven to expand and retract via the single motor, and the conventional electric running board is lowered to a suitable position, thus it is convenient for people to get on and off. However, the features of the conventional electric running board: only one motor is arranged on one side of the vehicle body, the single motor is installed together with a multi-link structure, and a bracket, which is not connected to an end of the motor, keeps extend and retract synchronously through a bracket linkage. In this case, a design of the conventional electric running board has the following disadvantages: during a process of the running board lifting up and down, it is easy to make two sides of a multi-link bracket be out of sync, which causes the running board surface to tilt.

The electric running board 20 provided by the embodiments of the present disclosure is driven by a dual-shaft drive structure of the dual-output motor 100 and matches with a structure of the gears matching with the links to realize synchronous and stable lifting of the electric running board 20. The disclosure provides an electric side running board provided with a unique and stable structure and being high performance to cost ratio. Furthermore, a transmission structure of the electric running board is provided with a simple installation, a stable structure and a low failure rate, to ensure that a motor torque is uniformly transmitted from a middle position to a front telescopic bracket and a rear telescopic bracket, that is to say, the front telescopic bracket may be the first transmission assembly 600, and the rear telescopic bracket may be the second transmission assembly 700.

In a specific application scenario provided by the embodiment of the present application, the dual-output motor 100, the first linkage group 200, and the second linkage group 300 are arranged on the connections 500, that is to say, in some embodiments, the connections 500 include a first connection 510, a second connection 520, and a third connection 530. Furthermore, the dual-output motor 100 is arranged on the first connection 510, the first linkage group 200 is arranged on the second connection 520, and the second linkage group 300 is arranged on the third connection 530. More specifically, the connections 500 are fixed on the carrier, and the first linkage group 200 and the second linkage group 300 are arranged on the two sides of the dual-output motor 100 and are connected to the dual-output motor 100, in other words, the first linkage group 200 is connected to the first output terminal 102 of the dual-output motor 100, and the second linkage group 300 is connected to the second output terminal 104. When the dual-output motor 100 located in the middle position of the electric running board 20 is energized, a torsional force is transmitted to the first linkage group 200 and the second linkage group 300, that is to say, the torsional force is transmitted to the first linkage group 200 via the first output terminal 102 of the dual-output motor 100, and the torsional force is transmitted to the second linkage group 300 via the second output terminal 104 of the dual-output motor 100 at the same time, so as to make a direction of the torsional force change, thereby driving the first transmission assembly 600 and the second transmission assembly 700 to move, and driving the running board element 800 to extend or retract. At the same time, in the embodiments of the present disclosure, it is possible to adapt to a variety of vehicle models by changing specifications of the transmission elements 400 and the connections 500, and be highly versatile. The dual-output motor 100 is located in a middle position of the vehicle body 30, so as to save space of a bracket, reduce a total weight of the bracket, and be conveniently to install. In addition, the electric running board 20 has a simple structure and is easy to maintain.

Figure 8:
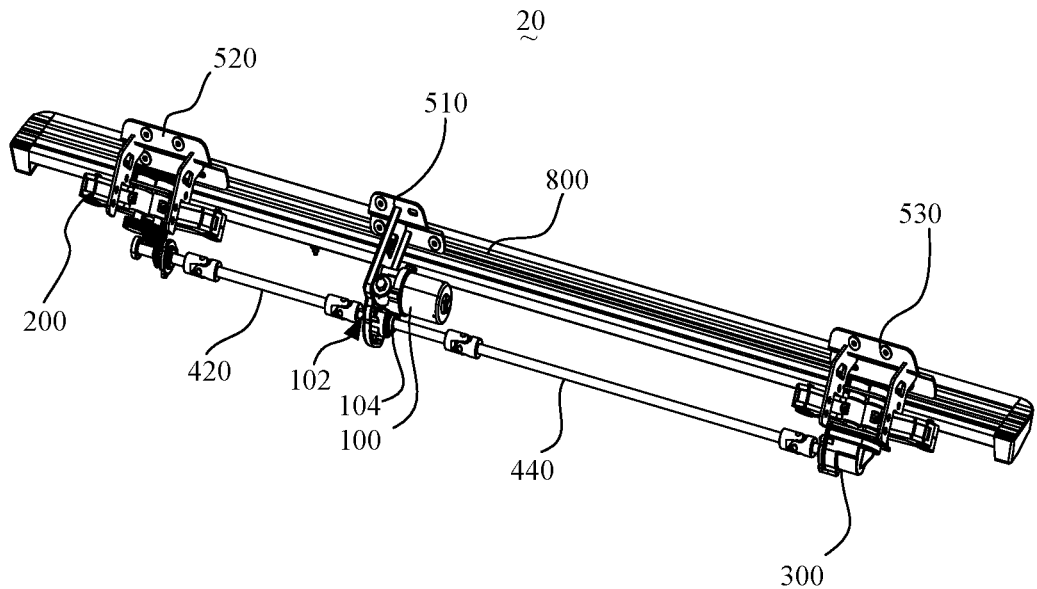
FIG. 8 is a structural view of another embodiment of the electric running board of the present disclosure in response to a housing of the first linkage group being removed.
Figure 9:
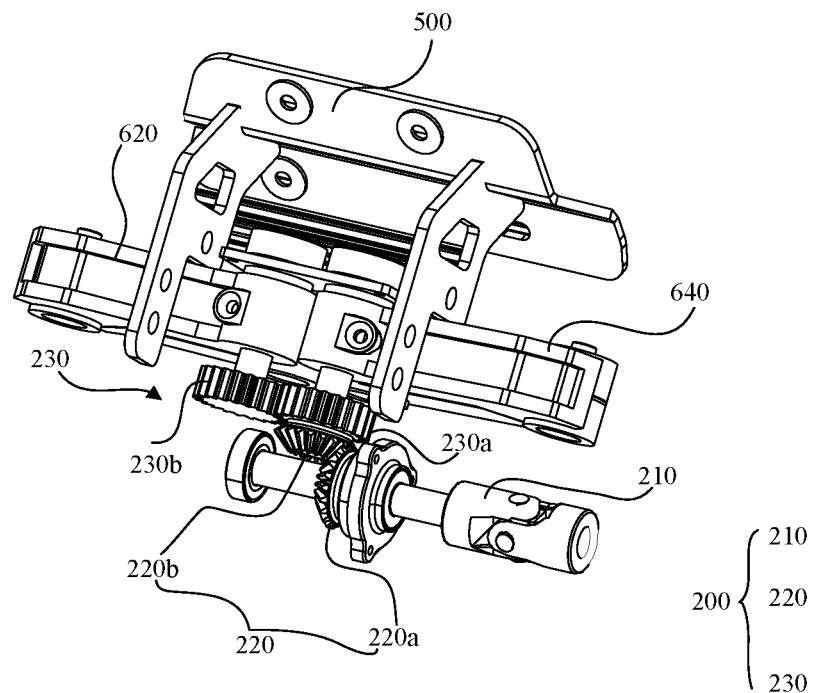
FIG. 9 is an enlarged view of the first linkage group in the embodiment of FIG. 8.

Further, referring to FIG. 8 and FIG. 9, FIG. 8 is a structural view of another embodiment of the electric running board of the present disclosure in response to a housing of the first linkage group being removed, and FIG. 9 is an enlarged view of the first linkage group in the embodiment of FIG. 8. As shown in FIG. 8, the electric running board 20 is in a retracted state, and the first transmission assembly 600 and the second transmission assembly 700 are in a retracted state at the same time. In this embodiment, the first linkage group 200 further includes a first sub-switching gear 220a, a second sub-switching gear 220b, the first sub-transmission gear 230a, and the second sub-transmission gear 230b. The first sub-switching gear 220a is driven to rotate by the first input part 210, and drives the second sub-switching gear 220b that is perpendicularly connected to the first sub-switching gear 220a to rotate, thereby driving the first sub-transmission gear 230a that is coaxially connected to the second sub-switching gear 220b to rotate; in this case, the second sub-transmission gear 230b, which is connected in parallel to the first sub-transmission gear 230a on a same plane, is driven to rotate in an opposite direction, thereby outputting forces in an opposite direction by the first sub-output part 240a and the second sub-output part 240b, thereby controlling the an extension or a contraction of the first transmission assembly 600, and thereby controlling the running board element 800 to extend or contract. Structures of the first linkage group 200 and the second linkage group 300 are substantially the same, and the number of gears and the positional relationship are not specifically limited herein.

Figure 10:
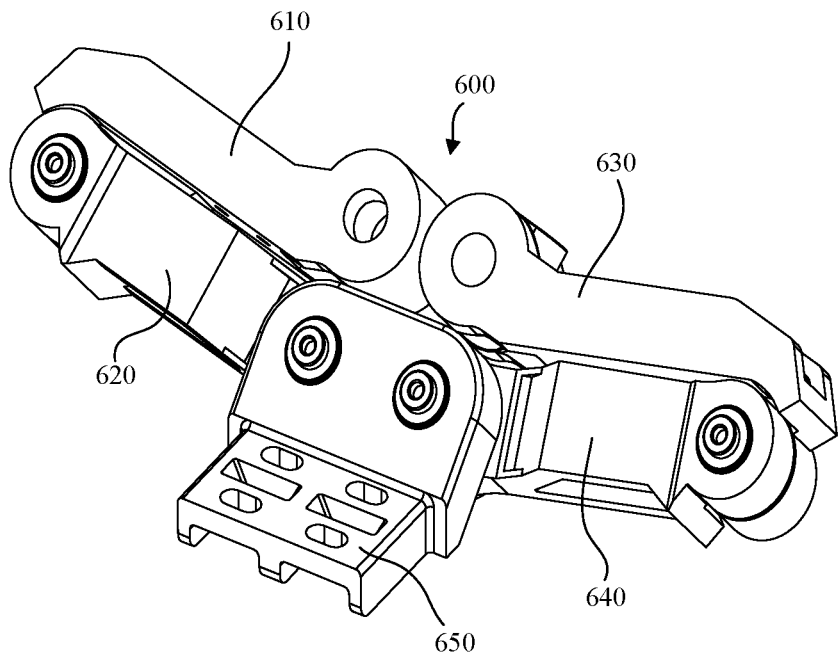
FIG. 10 is a structural view of a first transmission assembly in the embodiment of FIG. 8.
Figure 11:
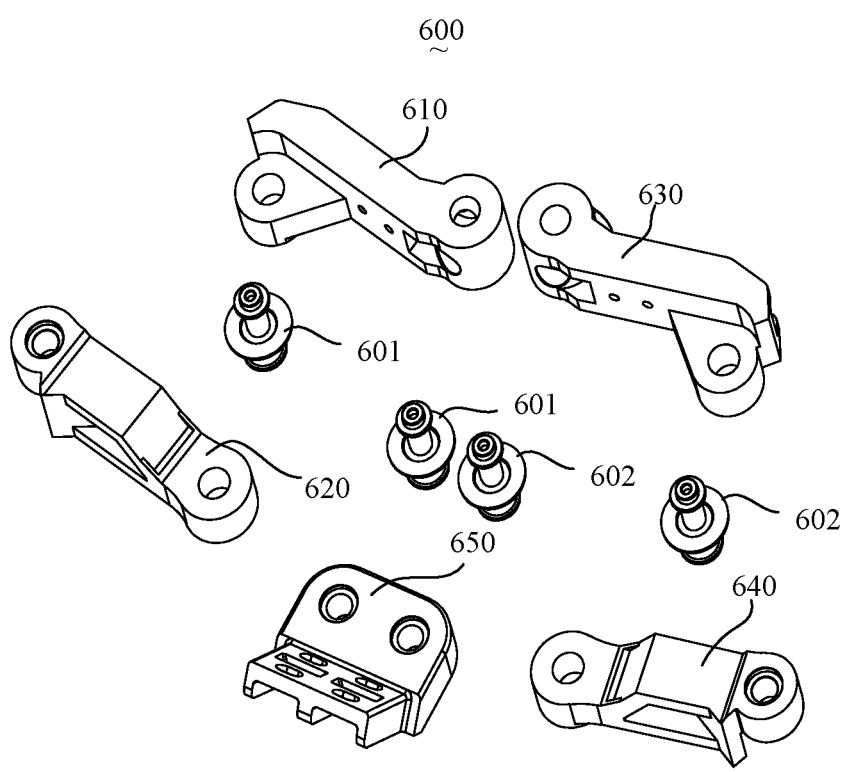
FIG. 11 is a partial exploded structural view of the embodiment of FIG. 10.

Further, referring to FIG. 10 and FIG. 11, FIG. 10 is a structural view of the first transmission assembly in the embodiment of FIG. 8, and FIG. 11 is a partial exploded structural view of the embodiment in FIG. 10. In some embodiments, the first transmission assembly 600 includes a first link 610, a second link 620, a third link 630, a fourth 640, and a first bearing component 650. The first link 610 and the second link 620 are pivotally connected, and the third connecting rod 630 and the fourth link 640 are pivotally connected. In addition, the first link 610 and the third link 630 are connected to the first linkage group 200, and the second link 620 and the fourth link 640 are connected to the first bearing component 650, so as to connect to the running board element 800, so that it is possible to control a power transmission to an opposite direction of the first link 610 and the third link 630, thereby controlling the extension and retraction of the transmission assembly 600. It should be noted that in this embodiment, the first link 610 is pivotally connected to the second link 620 by a bolt 601, and the third link 630 is also pivotally connected to the fourth link 640 via a second bolt 602. In other embodiments of the present disclosure, links are also pivotally connected by links connecting to annulus and the like, which is not specifically limited herein.

Specifically, referring to FIG. 2, the first transmission assembly 600 is connected to the first linkage group 200 in a first accommodating groove 250 defined by the first linkage group 200. The first link 610 is connected to the first sub-output part 240a, and the third link 630 is connected to the second output part 240b. More specifically, the first sub-output part 240a penetrates a first hole of the first link 610 to make the first link 610 clamped in a first groove of the first sub-output part 240a, and the second sub-output part 240b penetrates a second hole of the third link 630 to make the third link 630 clamped in a second groove of the second sub-output part 240b, so that it is possible that the first transmission assembly 600 is driven to move by the first linkage group 200. Further, the electric running board 20 controls the output directions of the first sub-output part 240a and the second sub-output part 240b through the dual-output motor 100, thereby controlling the extension and retraction of the first transmission assembly 600, so that it is possible to control the extension and retraction of the running board element 800.

It should be noted that, in the embodiment of the present disclosure, side walls of the first link 610, the second link 620, the third link 630, and the fourth link 640 may be hollow so as to reduce weight, thereby reducing a weight of the electric running board 20 and prolonging a service life of the electric running board 20. Elastic bumps are respectively arranged on the side walls of the first link 610, the second link 620, the third link 630, and the fourth link 640, so as to improve a stability of the first transmission assembly 600 being in the extended state, and at the same time, collisions between the above links can be buffered during the transition of the first transmission assembly 600 from the retracted state to the extended state.

The second transmission assembly 700 in the embodiment of the present disclosure includes a fifth link 710, a sixth link 720, a seventh link 730, an eighth link 740, and a second bearing component 750. The second transmission assembly 700 and the first transmission assembly 600 have substantially the same structures. The second transmission assembly 700 is connected to the second linkage group 300 in a second accommodating groove 350 defined by the second linkage group 300, and the connection way of the second transmission assembly 700 being connected to the second linkage group 300 is substantially the same as that of the first transmission assembly 600 being connected to the linkage group 200, which is not repeated herein.

Figure 13:
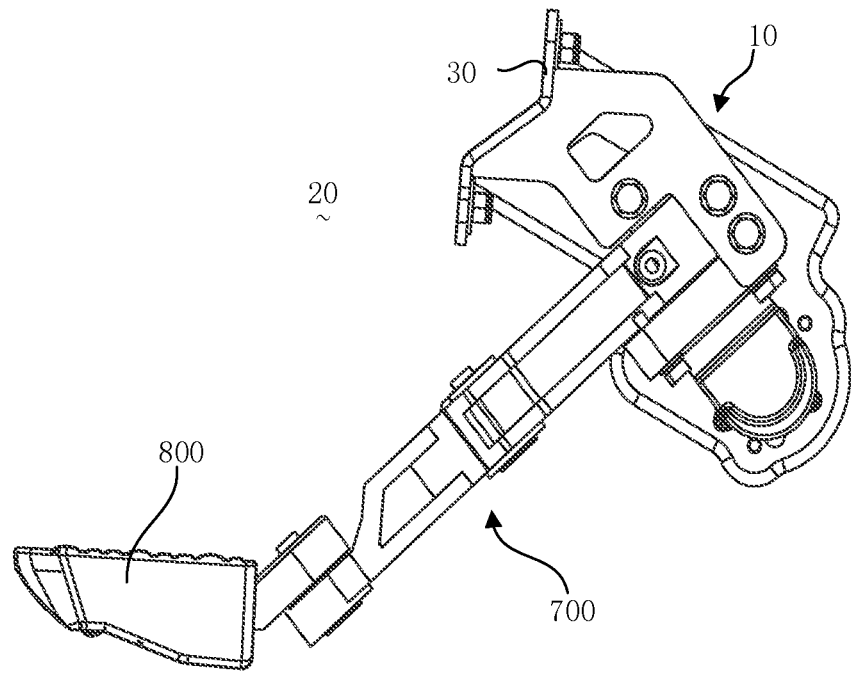
FIG. 13 is a side structural view of the embodiment in FIG. 12 in an extended state.

Referring to FIG. 12 and FIG. 13, FIG. 12 is a side structural view structural view of one embodiment of the electric running board of the present disclosure in a retracted state, and FIG. 13 is a structural side view of the embodiment in FIG. 12 in an extended state. In some embodiments, the linkage 10 of the embodiment is arranged on the inner side of the vehicle body 30, and the running board element 800 is arranged on the outer side of the vehicle body 30. In this case, the linkage 10 controls the extension and retraction of the first transmission assembly 600 and the second transmission assembly 700, thereby controlling the extension and retraction of the running board element 800. In this way, the linkage 10 is arranged on the inner side of the vehicle body 30, and the dual-output motor 100 is arranged on a middle of the linkage 10. Furthermore, when the running board element 800 is retracted, only the running board element 800 is exposed on the outer side of the vehicle body 30, so as to save the space, raise the stability, and protect the vehicle body 30.

In the description of the present disclosure, it is to be understood that terms such as "top", "bottom", "right", "front", "rear", "left", "inner", "outer", and the like, refer to the orientations and locational relations illustrated in the accompanying drawings. Thus, these terms used here are only for describing the present disclosure and explain a relative positional relationship and movement between the components in a specific posture (as shown in the accompanying drawings). If the specific posture changes, a directional indication will change accordingly.

The linkage 10 for the electric running board 20 provided by the embodiments of the present disclosure utilizes the structure of the double-shaft motor 100 driving at the two ends, and has the followings features: a stable structure and is convenient to install. Furthermore, the linkage 10 is arranged with a structure of the gears transmission and the gears engaging with the shafts, and it has the following features: a simple structure and being reliable to drive. In addition, the electric running board 20 provided by the embodiments of the present disclosure utilizes the structures of the first transmission assembly 600 and the second transmission assembly 700, and is capable of being stretchable. Moreover, by arranging the first transmission assembly 600 in the first linkage group 200 and arranging the second linkage assembly 700 in the second linkage group 300, a structure of gears matching with links is formed, which has the features of the reliable transmission and the simple structure. Furthermore, through the linkage 10 matching with the running board assembly 800, it is possible to make the electric running board 20 synchronously lift, have a stable structure, be highly versatile, and the reliable transmission.

The descriptions of the present disclosure are only a part of the embodiments of the present disclosure, which do not limit the scope of protection of the present disclosure. Any equivalent device or equivalent process transformation made using the content of the descriptions and drawings of the present disclosure, or directly or indirectly used in other related technical fields, is included in the scope of patent protection of the present disclosure.

What is claimed is:

1. A linkage for an electric running board, comprising:
   a dual-output motor, comprising a first output terminal and a second output terminal;
   a first linkage group; and
   a second linkage group; wherein the first output terminal of the dual-output motor is connected to the first linkage group, and the second output terminal of the dual-output motor is connected to the second linkage group;
   the first linkage group comprises:
     a first input part;
     a first transmission part; and
     a first output part; wherein the first input part is connected to the first output terminal of the dual-output motor, the first transmission part is connected to the first input part, and the first output part is connected to the first transmission part;
   the second linkage group comprises:
     a second input part;
     a second transmission part; and
     a second output part; wherein the second input part is connected to the second output terminal of the dual-output motor, the second transmission part is connected to the second input part, and the second output part is connected to the second transmission part;
   the first transmission part comprises a first switching gear and a first transmission gear, the first switching gear is connected to the first input part, the first transmission gear is connected to the first output part, and the first switching gear is connected to the first transmission gear; and
   the second transmission part comprises a second switching gear and a second transmission gear, the second switching gear is connected to the second input part, the second transmission gear is connected to the second output part, and the second switching gear is connected to the second transmission gear.

2. The linkage of claim 1, further comprising a first transmission member and a second transmission member, wherein the first output terminal of the dual-output motor is connected to the first linkage group through the first transmission member, and the second output terminal of the dual-output motor is connected to the second linkage group through the second transmission member.

3. The linkage of claim 1, wherein the first linkage group further comprises a first sub-switching gear, a second sub-switching gear, a first sub-transmission gear, a second sub-transmission gear, a first sub-output part, and a second sub-output part; the first sub-switching gear is connected to the second sub-switching gear to form an included angle, the second sub-switching gear is connected to the first sub-transmission gear, the first sub-transmission gear is connected to the second sub-transmission gear, the first sub-transmission gear is connected to the first sub-output part, and the second sub-transmission gear is connected to the second sub-output part; and a rotation direction of the first sub-output part is opposite to a rotational direction of the second sub-output part; and
   the second linkage group comprises a third sub-switching gear, a fourth sub-switching gear, a third sub-transmission gear, a fourth sub-transmission gear, a third sub-output part, and a fourth sub-output part; the third sub-switching gear is connected to the fourth sub-switching gear to form an included angle, the fourth sub-switching gear is connected to the third sub-transmission gear, the third sub-transmission gear is connected to the fourth sub-transmission gear, the third sub-transmission gear is connected to the third sub-output part, and the fourth sub-transmission gear is connected to the fourth sub-output part; and a rotation direction of the third sub-output part is opposite to a rotational direction of the fourth sub-output part.

4. An electric running board, comprising:
   a running board assembly; and
   a linkage, connected to the running board assembly;
   wherein the linkage comprising:
     a dual-output motor, comprising a first output terminal and a second output terminal;
     a first linkage group, connected to the first output terminal; and
     a second linkage group, connected to the second output terminal;
   the running board assembly comprises a first transmission assembly, a second transmission assembly and a running board element; the first transmission assembly is connected to the first linkage group, the second transmission assembly is connected to the second linkage group, and the running board element is connected to the first transmission assembly and the second transmission assembly; and
   the first linkage group comprising:
     a first accommodating groove; and
     a first output part penetrating the first accommodating groove:
   the second linkage group comprising:
     a second accommodating groove; and
     a second output part penetrating the second accommodating groove.

5. The electric running board of claim 4, wherein the first transmission assembly is arranged on the first linkage group, and the second linkage assembly is arranged on the second linkage group.

6. The electric running board of claim 4, wherein the first transmission assembly is connected to the first output part in the first accommodating groove, and the second transmission assembly is connected to the second output part in the second accommodating groove.

7. The electric running board of claim 6, wherein the first transmission assembly comprises a first link, a second link, a third link, and a fourth link; the first link is pivotally connected to the second link, and the third link is pivotally connected to the fourth link;
the second transmission assembly comprises a fifth link, a sixth link, a seventh link, and an eighth link; the fifth link is pivotally connected to the sixth link, and the seventh link is pivotally connected to the eighth link.

8. The electric running board of claim 7, wherein the first linkage group comprises a first sub-output part and a second sub-output part, and a rotational direction of the second sub-output part is opposite to a rotational direction of the first sub-output part; the first link is connected to the first sub-output part, and the third link is connected to the second sub-output part;
the second linkage group comprises a third sub-output part and a fourth sub-output part, and a rotational direction of the third sub-output part is opposite to a rotational direction of the fourth sub-output part; the fifth link is connected to the third sub-output part, and the seventh link is connected to the fourth sub-output part.

9. The electric running board of claim 8, wherein the first transmission assembly comprises a first bearing part, and the second link and the fourth link are connected to the running board element through the first bearing part;
The second transmission assembly comprises a second bearing part, and the sixth link and the eighth link are connected to the running board element through the second bearing part.

10. A linkage for an electric running board, comprising:
a dual-output motor, comprising a first output terminal and a second output terminal;
a first linkage group connected to the first output terminal;
a second linkage group connected to the second output terminal;
a first transmission member arranged between the first linkage group and the dual-output motor; and
a second transmission member arranged between the second linkage group and the dual-output motor;
wherein the first transmission member is configured to synchronously transmit a power outputted by the dual-output motor to the first linkage group, and the second transmission member is configured to synchronously transmit a power outputted by the dual-output motor to the second linkage group; and the first input part is provided with a first fixed protrusion, and the second input part is provided with the second fixed protrusion.

11. The linkage of claim 10, wherein the first linkage group comprises:
a first input part, connected to the first output terminal and configured to transmit the power outputted by the dual-output motor from the first output terminal to the first linkage group;
a first transmission part, connected to the first input part and configured to change a direction of a power inputted by the first input part and transmit the power to the first output part; and
a first output part, connected to the first transmission part and configured to output a power converted and transmitted by the first transmission part;
the second linkage group comprises:
a second input part, connected to the second output terminal and configured to transmit the power outputted by the dual-output motor from the second output terminal to the second linkage group;
a second transmission part, connected to the second input part and configured to change a direction of a power inputted by the second input part, and transmit the power to the second output part; and
a second output part, connected to the first transmission part and configured to output the power converted and transmitted by the second transmission part.

12. The linkage of claim 10, wherein a first junction is arranged between the first transmission member and the first input part, and a second junction is arranged between the second transmission member and the second input part; the first junction and the second junction are provided with thread structures.

13. The linkage of claim 10, further comprising:
a first connection, which the dual-output motor is arranged on;
a second connection, which the first linkage group is arranged on; and
a third connection, which the second linkage group is arranged on.

14. The linkage of claim 13, wherein the first connection, the second connection, and the third connection are fixing brackets.

15. The linkage of claim 10, wherein materials of the first linkage group and the second linkage group are stainless steel, rigid plastic, resin or aluminum alloy.

* * * * *